United States Patent
Zachos et al.

(10) Patent No.: US 12,341,750 B2
(45) Date of Patent: Jun. 24, 2025

(54) ARRANGEMENT OF CYBER SECURITY AND PROGNOSTICS, COEXISTING ON A SINGLE PLATFORM

(71) Applicant: Dearborn Group, Inc., Farmington Hills, MI (US)

(72) Inventors: Mark P. Zachos, West Bloomfield, MI (US); Prakash K. Kulkarni, Novi, MI (US)

(73) Assignee: Dearborn Group, Inc., Farmington Hills, MI (US)

( * ) Notice: Subject to any disclaimer, the term of this patent is extended or adjusted under 35 U.S.C. 154(b) by 186 days.

(21) Appl. No.: 17/964,648

(22) Filed: Oct. 12, 2022

(65) Prior Publication Data

US 2023/0119190 A1    Apr. 20, 2023

Related U.S. Application Data

(60) Provisional application No. 63/257,696, filed on Oct. 20, 2021.

(51) Int. Cl.
*H04L 29/06* (2006.01)
*H04L 9/40* (2022.01)
*H04L 67/12* (2022.01)

(52) U.S. Cl.
CPC ...... *H04L 63/0209* (2013.01); *H04L 63/1425* (2013.01); *H04L 63/1433* (2013.01); *H04L 67/12* (2013.01)

(58) Field of Classification Search
None
See application file for complete search history.

(56) References Cited

U.S. PATENT DOCUMENTS

| | | | | |
|---|---|---|---|---|
| 2018/0219878 | A1* | 8/2018 | Hirshberg | G06F 21/85 |
| 2019/0394089 | A1* | 12/2019 | Barrett | H04L 41/0816 |
| 2019/0394230 | A1* | 12/2019 | Park | H04L 45/302 |
| 2021/0266295 | A1* | 8/2021 | Stroz | H04L 63/0263 |

* cited by examiner

*Primary Examiner* — Bradley W Holder
(74) *Attorney, Agent, or Firm* — Warn Partners, P.C.

(57) ABSTRACT

A vehicle network security arrangement for a vehicle, having a network vulnerable to attacks from at least one threat. One or more external devices, being a source of at least one threat, are connectable and communicate with a vehicle network. A cyber security device is connected to the network and receives data being sent to and data transmitted from the network. The cyber security device includes a memory and an anomaly detection system (ADS) that detects the at least one threat in the data being begin sent to the network and the data being sent from the network. A memory of the cyber security device keeps a data log that contains information concerning the at least one threat, which is accessible by a user accessing the memory of the cyber security device.

24 Claims, 2 Drawing Sheets

ARRANGEMENT OF CYBER SECURITY AND PROGNOSTICS, COEXISTING ON A SINGLE PLATFORM

CROSS-REFERENCE TO RELATED APPLICATIONS

This application is a non-provisional application and claims benefit of U.S. Provisional Patent Application No. 63/257,696; filed Oct. 20, 2021. The disclosure of the above application is incorporated herein by reference.

FIELD OF THE INVENTION

The present invention relates to a module for providing standalone cyber security to a network that is incorporated into a telematics device, electronic control unit or is an add-on single platform device connected to a diagnostics port on a vehicle.

BACKGROUND OF THE INVENTION

In ground vehicles it is common to have cyber-enabled devices that transcend the physical rolling chassis of a ground vehicle. As more and more vehicles become connected to a cloud on the Internet the future will involve communication being achieved using some type of telematic device or communication device incorporated into the electronic control unit of the vehicle, which has been preprogrammed with some type of cyber-security features. However, many of the security standards are still being developed and will need updates in the future. As a result, many vehicles existing today communicate with the Internet in a manner that leaves the vehicle vulnerable to cyber-attacks. Also, some vehicles are considered "legacy" vehicles, which include vehicles without telematics and vehicle having older communications protocols that are not able to be directly modified to include current cybersecurity measures. Legacy vehicles also include vehicles that do not have a secure gateway, which is a gateway on the vehicle that implements other functions specifically for protection against cyber-attacks, thereby enhancing the cybersecurity profile of the vehicle.

Undesirable hacking can occur from different attack vectors, including cyber-attacks that originate from the Internet and are transmitted to a controller area network (CAN) bus from wireless devices on the vehicle or through a hardwire connection from an internet enabled computer connecting through the vehicle diagnostics port. Additionally, physical hacking of the system can occur, where a hardwire connection with a rogue node or other man in the middle attacks, where the CAN bus is hacked using a hardwire connection that bypasses the diagnostics port and then imitates a node on the network. A common maintenance action for a ground vehicle may be to update the firmware for the engine. This can be for various reasons, like improved power output, more reliable interpretation and diagnostics of fault conditions, or vehicle parameter changes. Regardless of the reason for the update to the ECU, the mechanism involves the diagnostic computer identifying the ECU eligible for the firmware update. It will often send a request to the manufacturer/supplier of the ECU to determine if there is new firmware available. Some systems may customize the firmware distribution based on user defined parameters and compile the distributable machine code from the server to the diagnostics application running on the PC. After the new firmware or parameter updates are obtained on the local PC, a diagnostics session will ensue, and the firmware is transferred to the appropriate ECU over the network. This usually follows a protocol defined in either the J1939 standard or as defined in the ISO 15765 standard.

One of the big challenges of detecting an intrusion is classifying any unintended code embedded into the firmware being uploaded to the ECU. This is a challenge because the machine code itself is unknown and potentially unique for every ECU. Therefore, any traditional anomaly detection system will not be able to identify a good firmware image from a malicious one. This means, the intrusion defense system must be designed to allow for these updates to occur, but it must limit the effect of a particular ECU from becoming rogue. To confound the issue, firmware is often considered to be proprietary, which makes testing and validation examining the re-flashing process even harder. In the end, ECU firmware is preferably digitally signed by the originator (at a minimum). Encrypted firmware could be another improvement.

There is a need to enhance the cybersecurity profile of a vehicle by providing intrusion detection that will detect, send an "intrusion alert message and the data is logged so that it can be reviewed when the vehicle is stationary, such as during a diagnostic session. There is a need to provide secure in-vehicle communication as well as secure PC-vehicle communication.

For existing vehicles that connect to the Internet and legacy vehicles there is a need to provide enhanced security to protect against as many cyber threats as possible, by providing an add-on type of cyber security device. There also exists a need today to develop cyber security devices that can be incorporated on future vehicles that will protect them from cyber threats.

SUMMARY OF THE INVENTION

The present invention is directed to a vehicle network security arrangement for a vehicle. The vehicle network security arrangement is installed at a diagnostics port of a vehicle, but also includes any network communication in the vehicle. Alternatively, the vehicle network security arrangement is implemented into a telematic device or be part of the circuitry of a network. The vehicle network security arrangement according to the present invention monitors network traffic on the network that is vulnerable to third party attacks from one or more attack vectors. The vehicle further includes a diagnostics port connectable to the network of the vehicle for sending and receiving. The cyber security device includes an anomaly detection system ADS that searches and identifies one or more anomalies on the network.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein.

DETAILED DESCRIPTION OF THE PREFERRED EMBODIMENTS

Figure 1:
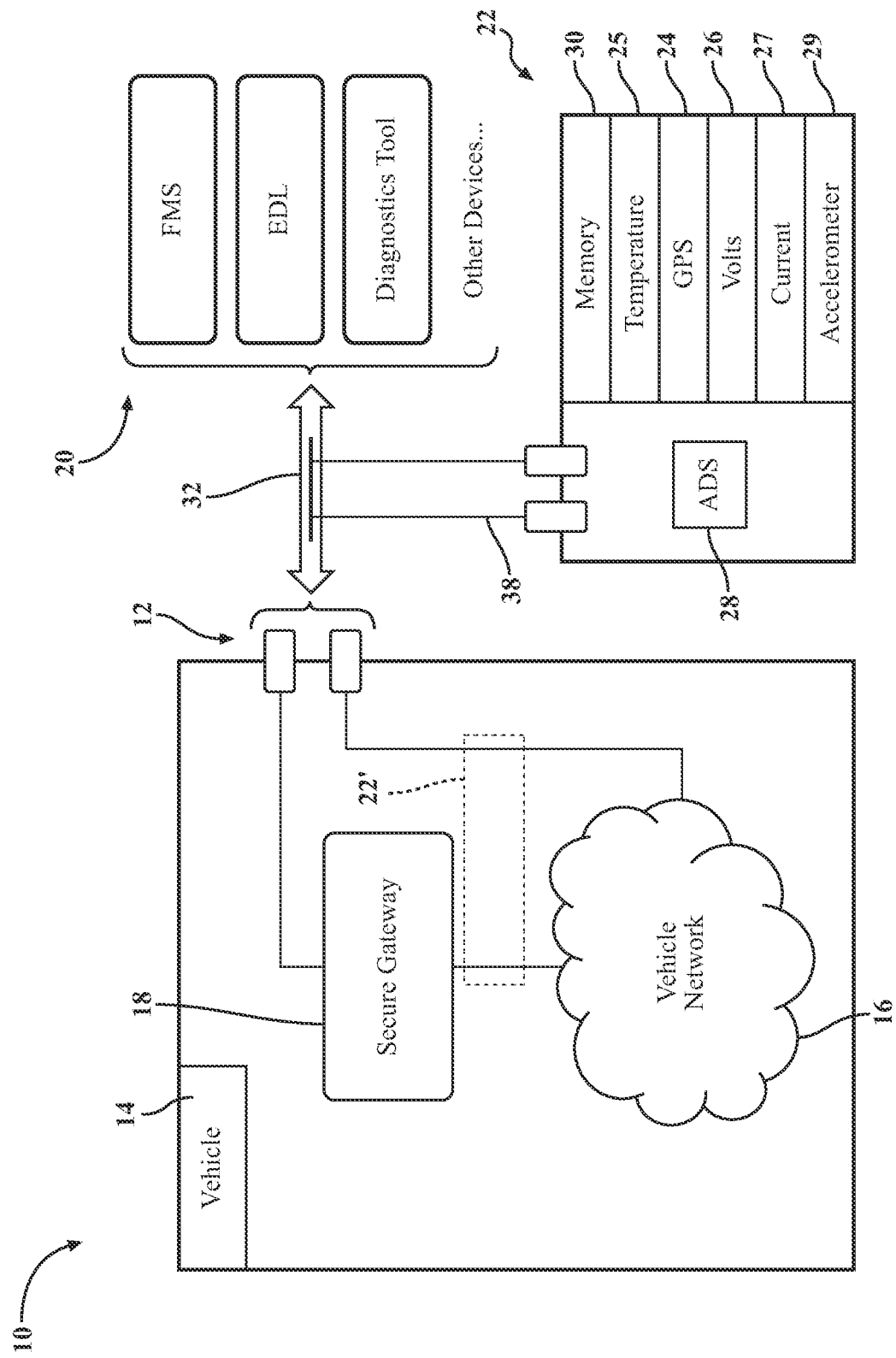
FIG. 1 is a schematic diagram showing the cyber security device arrangement for a vehicle according to a first embodiment of the invention.

The following description of the preferred embodiments is merely exemplary in nature and is in no way intended to limit the invention, its application, or uses.

The present invention is directed to a vehicle network security arrangement 10 for a vehicle. The vehicle network security arrangement 10 is installed at a communication port, shown as a diagnostics port 12 of a vehicle 14. Alternatively, the vehicle network security arrangement 10 is implemented into a telematic device or is part of the circuitry of a network 16. The vehicle network security arrangement 10 according to the present invention receives communications from the network 16 that are vulnerable to third party attacks from one or more attack vectors. While diagnostics port 12 is shown it is within the scope of the invention for the diagnostics port 12 to be any type of communication port that is either wired or wireless.

The diagnostic port 12 is connected to the network 16. Some of the communications from the diagnostic port 12 is passed through a secure gateway 18 to control the flow of communications in bound from external devices 20 connected to the diagnostic port 12. In the case of a legacy vehicle there may not be a secure gateway between the diagnostics port and the network because legacy vehicles do not communicate wirelessly or with the Internet. Instead, legacy vehicles rely on the diagnostics port 12 to communicate with external devices, which can then communicate with the Internet.

The vehicle network security arrangement 10 further includes a cyber security device 22 with a connection to the diagnostic port 12 that permits the cyber security device 22 to communicate with the network 16. The cyber security device 22 operates while the vehicle is running. The cyber security device 22 an anomaly detection system (ADS) 28 that monitors data on the network 16, searches and identifies one or more anomalies on the network 16 and generates an intrusion alert message on the network 16. Also, the cyber security device 22 includes a memory 30 for that the cyber security device 22 to externally log all data before and after the occurrence of the anomaly, which is reviewable when the vehicle is not moving and is connected to an external device either wirelessly to the cyber security device 22 or physically to the diagnostic port 12.

When the vehicle 14 is a legacy vehicle or if the vehicle 14 has external hardwire diagnostics port 12, the cyber security device 22 is connected at the diagnostics port 12, 12b on the vehicle 14 using a hardwired connection between the diagnostics port 12 and the external devices 20. The cyber security device 22 is had a "teed" connection that receives communications going both ways through the diagnostics port 12. Shown in phantom lines is a cyber security device 22', which is an alternate location where the cyber security device 22' is integrated within the vehicle either as an additional piece of hardware or as part of the secure gateway 18. In this alternate location the cyber security device 22' is located in the vehicle 14 at a position between the diagnostics port 12 where the one or more communications are received from external devices 20 and the vehicle network 16.

The cyber security device 22 includes several subcomponents that are both hardware and software. These sub-components include one or more measurement generators that generate data that augments the data monitored on the network 16 that the cyber security device 22 then logs condition based maintenance messages to the memory 30 of the cyber security device 22 relating to the maintenance needs of the vehicle 14. The one or more measurement generators include but are not limited to a global positioning satellite unit 24, a temperature sensor 25, a voltage sensor 26, a current sensor 27 and an accelerometer sensor 29. The above mentioned sub-components provide valuable context information that can be valuable for forensic analysis of any cybersecurity events.

In one example the measurement generator is a global positioning satellite unit 24 used is for vehicle 14 location verification. The global positioning satellite unit 24 is used to independently calculate the coordinates of the cyber security device 22 and the vehicle 14 that it is attached to. This allow the cyber security device 22 to independently compare the coordinates with the data located on the ECU of the vehicle 14, which if different could be identified as a threat.

The measurement generator can include other devices not described above, and it is within the scope of this invention to be any a device that determines and verifies a measurable characteristic and compares it to the data located on the network 16 to also determine if a threat is present. Other measurable characteristics of the measurement generator include but are not limited to time, remote active agent status, local active agent status, acceleration, voltage usage by the vehicle 14, temperature of the engine or air, amperes, engine rotations per minute, engine status etc. It is further within the scope of this invention for the measurements to be inputted through the diagnostic port 12 to the network 16 for further augment and verification of data monitored on the network, which is then used by the network 16 to generate condition based maintenance messages to the network relating to the maintenance needs of the vehicle 14.

The cyber security device 22 also detects one or more threats at the at the diagnostics port or from some other point of intrusion into the network 16. Examples of threats include but are not limited to a high energy event at the diagnostics port 12, a time shifted agent, a remote active agent, and a local active agent.

The vehicle network security arrangement 10 uses the cyber security device 22, or cyber security programmed on the ECU for a newer vehicle, to monitor communications at the diagnostic port 12 for anomalies. One or more anomalies include a stop start broadcast message while the vehicle is moving, which is a signal that tries to make the vehicle engine shut-off or start-up while the vehicle is in motion. Such a communication would be an anomaly because the current vehicle conditions suggest it is currently operating and in motion. Another example of an anomaly includes a memory access request while the vehicle is moving, where the external devices 20, which can be connected wirelessly, are requesting access to the memory of the ECU of the vehicle 14. An imposter alert is another type of anomaly that would be detected by the cyber security device. This is when another device communicates through the diagnostic port 12a, 12b by trying to mimic communications of legitimate external devices 20 but is determined to be an imposter because the cyber security device determines the device signature of the external devices 20 is not valid. Other anomalies detected by the cyber security device include an impending denial of service attack (DOS), spoofed vehicle speed and/or acceleration rate, potential ADF/MTD content enabled by LINUX interface. A Denial-of-Service (DoS) attack is an attack meant to shut down a machine or network, making it inaccessible to its intended users. DoS attacks accomplish this by flooding the target with traffic or sending it information that triggers a crash. A malicious cyber threat actor may try this. Mobile threat defense (MTD) is sophisticated, dynamic protection against cyber threats targeted against mobile devices. With MTD, protection is applied to devices, networks, and applications. A spoofed speed and/or acceleration rate is an event where the speedometer is hacked to show the incorrect speed. This can cause the cruise control to work incorrectly by adjusting the vehicle to the wrong speed or causing improper acceleration.

Figure 2:
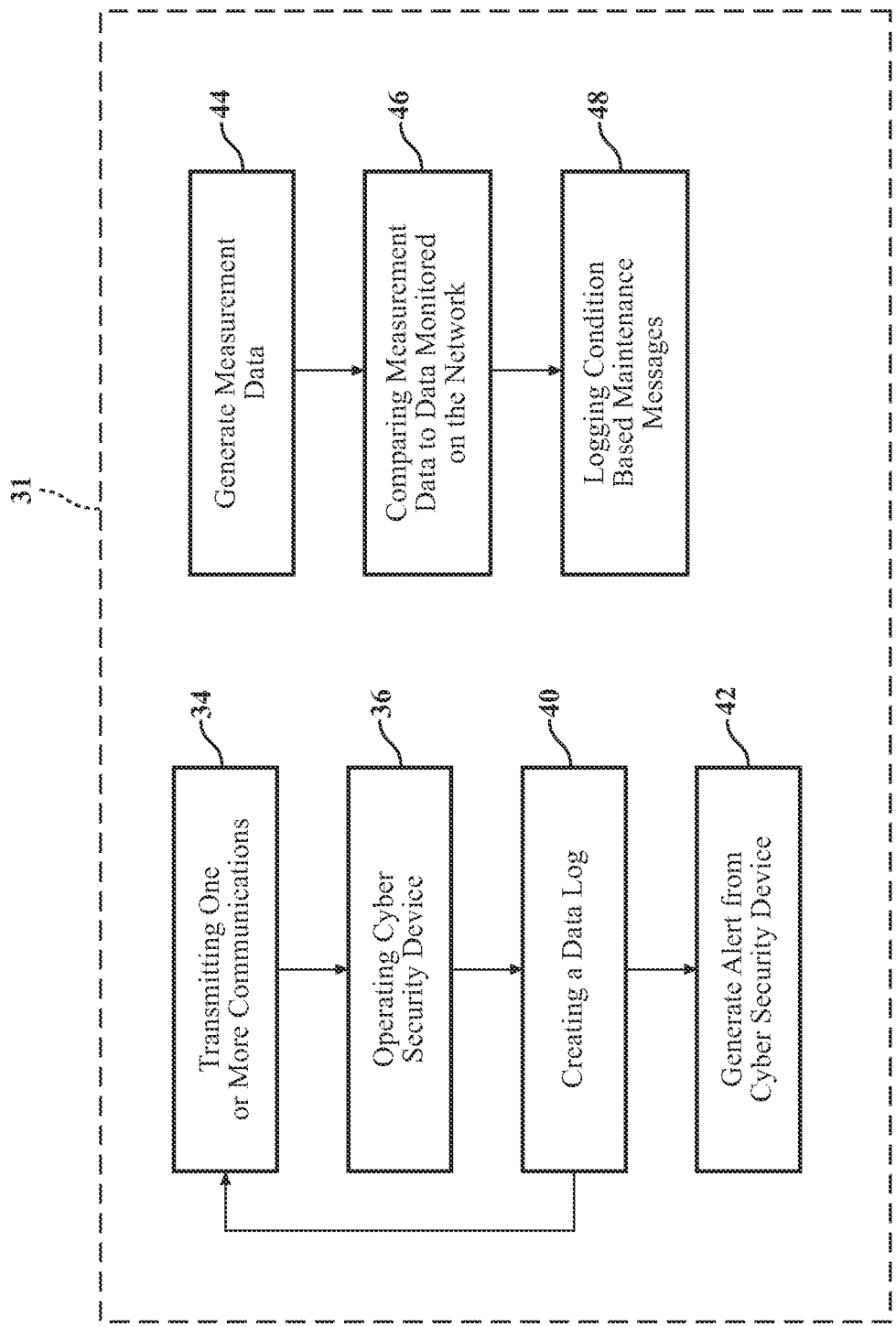
FIG. 2 is a flow diagram showing the steps of a method of operating a vehicle network security arrangement.

Referring now to FIGS. 1 and 2 a method of operating a vehicle network security arrangement 31 is shown and will now be described. The method 31 includes providing the vehicle 14 having the network 16 that is able to communicate with external devices 20 through one of a wired connection, shown as the diagnostic port 12 or some type of wireless connection. The method 31 further includes providing the cyber security device 22 with a connection to the network 16 that permits the cyber security device 22 to receive data being sent to the network 16 and receive data being transmitted from the network 16 to the external devices 20. The cyber security device 22 includes an anomaly detection system 28 for detecting at least one threat 32 being communicated to the network 16 from the external devices 20. The cyber security device 22 has a memory 30 that is used to record a data log of any activity detected by the anomaly detection system 28.

The method 31 further includes a step 34 of transmitting one or more communications containing the at least one threat 32 (shown as an arrow) from the external devices 20 to the network 16 through diagnostic port 12. A step 36 includes operating the cyber security device 22 using the anomaly detection system 28 to monitor the one or more communications at to detect the at least one threat 32. In the embodiment shown the step 36 is occurring through a teed connection 38 between the diagnostics port 12 and the external devices 20. This occurs in embodiments where the cyber security device 22 is added externally onto the vehicle 14 for both wired and wireless communications between the external devices 20 and the network 16. As described above other embodiments of the invention include having the cyber security device 22' located internally between the diagnostic port 12 and the network 16.

Step 40 includes creating a data log on the memory 30 of the cyber security device 22. The data log contains information concerning the threat 32 and the data log is accessible by a user accessing the memory 30 of the cyber security device 22. The method 31 can then return to the step 34 or the method 31 also optionally includes a step 42 of generating an alert from the cyber security device 22 to the network 16 of the vehicle 16, indicating that the threat 32 has been detected.

The threat 32 can take many forms and generally speaking is one or more of the group including a local active agent, a remote active agent, a time shift agent and a high energy event. Where the threat 32 is a local active agent, a specific example is where the external devices 30 are attempting to send one of a diagnostic event communication or re-flashing communication to the network 16. The term "re-flash" or "re-flashing" as used herein is defined as reinstalling or updating firmware operating on the network 16. Where the threat 32 is a remote active agent, a specific example is where the external devices 30 are attempting to send in an anomalous message that is not on a permitted list residing on the anomaly detection system 28 of the cyber security device 22. Where the threat 32 is a time shift agent, a specific example is where the external devices 30 are attempting to re-flash the vehicle network during and inappropriate time causing the cyber security device to create a time shift log of the unexpected behavior that is recorded on the memory 30. The time shift log includes vehicle location derived from the global positioning satellite coordinates and inertial measurement unit data concerning the movement of the vehicle 14. Where the threat 32 is a high energy event or a spoofed high energy event the cyber security device 22 creates a high energy event log of the unexpected event that is recorded on the memory 30. The high energy event log includes vehicle location derived from the global positioning satellite coordinates and inertial measurement unit data concerning the movement of the vehicle 14. Many vehicle components are designed to operate using set voltages or amperes. When the energy of these components spikes it is an indicator of part failure or malfunction, so the vehicle network monitors energy usage of these components. A specific example of a high energy event or a spoofed high energy event is an abnormally high voltage reading by a throttle body actuator, which can affect vehicle speed.

The following step 44, step 46 and step 48 can occur at any time, but it is contemplated that they will occur in tandem with step 34, step 36 and step 40. The step 44 includes providing one or more measurement generators on the cyber security device 22 that generate measurement data that augments the data monitored on the network 16. The method 31 further includes step 46 of operating the cyber security device 22 to compare the measurement data to the data monitored on the vehicle network, followed by a step 48 of logging condition based maintenance messages to the memory 30 of the cyber security device 22 relating to the maintenance needs of the vehicle 14.

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. A vehicle network security arrangement for a vehicle comprising:
   a network vulnerable to attacks from at least one threat wherein the network is connected to a diagnostics port;
   one or more external devices connected to the network through the diagnostics port using one of a wireless connection or a physical connection between the one or more external devices and the diagnostics port, wherein the one or more external devices send one or more communications to the network that include a source of at least one threat, wherein the one or more external devices transmit one or more communications to the network, wherein the one or more communications is a source of the at least one threat;
   a cyber security device with a connection to the network that permits the cyber security device to receive data being sent to and data transmitted from the network, wherein the cyber security device includes a memory and an anomaly detection system (ADS) that detects the at least one threat in the data being sent to the network and the data being sent from the network;
   a data log on the memory of the cyber security device, wherein the data log contains information concerning the at least one threat and the data log is accessible by a user accessing the memory of the cyber security device wherein the cyber security device includes one or more measurement sensors on the cyber security device that generate sensor data that augments the data monitored on the network and then logs condition based maintenance messages on the memory of the cyber security device relating to the maintenance needs of the vehicle.

2. The vehicle network security arrangement of claim 1 wherein the at least one threat includes one selected from the group comprising: a stop start broadcast message while the vehicle is moving, a memory access request while the vehicle is moving, an imposter alert, an impending denial of service attack (DOS), a spoofed vehicle speed and/or acceleration rate, a potential mobile thread defense (MTD) content enabled by LINUX interface.

3. The vehicle network security arrangement of claim 1 further comprising:
wherein the vehicle is a legacy vehicle that is one of a vehicle having communications protocols that are not able to be directly modified to include cybersecurity measures or a vehicle that does not have a secure gateway, and
the cyber security device is connected at the diagnostics port on the vehicle creating a wired connection to the network.

4. The vehicle network security arrangement of claim 1 wherein the at least one threat includes one or more of the following: an energy event at the diagnostics port where energy of a vehicle component exceeds a set voltage or ampere, a time shifted agent, a remote active agent, and a local active agent.

5. The vehicle network security arrangement of claim 1 wherein the one or more measurement sensors on the cyber security device include a global positioning satellite unit, a temperature sensor, a voltage sensor, a current sensor and an accelerometer sensor.

6. The vehicle network security arrangement of claim 1 wherein the cyber security device is contained in the vehicle and is positioned between a communications port and an internal network where the one or more communications from the one or more external devices are received.

7. The vehicle network security arrangement of claim 6 wherein the communications port is wireless.

8. The vehicle network security arrangement of claim 6 wherein the communications port is a wired diagnostic port.

9. The vehicle network security arrangement of claim 1 wherein the at least one threat is one or more from the group including a local active agent, a remote active agent, a time shift agent and an energy event where energy of a vehicle component exceeds one of a set voltage or set current and the cyber security device creates an event log of the energy event that is recorded on the memory of the cyber security device.

10. The vehicle network security arrangement of claim 9 wherein the at least one threat is a local active agent where the one or more external devices sends to the one or more external devices through the diagnostics port, one of a diagnostic event communication or a re-flashing communication to the network and the cybersecurity device creates a high energy event log of the event that is recorded on a memory.

11. The vehicle network security arrangement of claim 9 wherein the at least one threat is a remote active agent wherein the one or more external devices sends to the network through the diagnostics port an anomalous message that is not on a permitted list residing on the anomaly detection system of the cyber security device.

12. A vehicle network security arrangement for a vehicle comprising:
a network vulnerable to attacks from at least one threat, wherein the network is connected to a diagnostics port;
one or more external devices connected to the network through the diagnostics port using one of a wireless connection or a physical connection between the one or more external devices and the diagnostics port, wherein the one or more external devices send one or more communications to the network, wherein the one or more communications is a source of the at least one threat;
a cyber security device with a connection to the network that permits the cyber security device to receive data being sent to and data transmitted from the network, wherein the cyber security device includes a memory and an anomaly detection system (ADS) that detects the at least one threat in the data being sent to the network and the data being sent from the network;
a data log on the memory of the cyber security device, wherein the data log contains information concerning the at least one threat and the data log is accessible by a user accessing the memory of the cyber security device, wherein the at least one threat is a time shift agent wherein the one or more external devices is attempting to re-install or update the firmware on the network causing the cyber security device to create a time shift log of the unexpected behavior.

13. The vehicle network security arrangement of claim 12 wherein the time shift log includes vehicle location derived from the global positioning satellite coordinates and inertial measurement unit data concerning the movement of the vehicle.

14. A vehicle network security arrangement for a vehicle comprising:
a network vulnerable to attacks from at least one threat, wherein the network is connected to a diagnostics port;
one or more external devices connected to the network through the diagnostics port using one of a wireless connection or a physical connection between the one or more external devices and the diagnostics port, wherein the one or more external devices send one or more communications to the network, wherein the one or more communications is a source of the at least one threat;
a cyber security device with a connection to the network that permits the cyber security device to receive data being sent to and data transmitted from the network, wherein the cyber security device includes a memory and an anomaly detection system (ADS) that detects the at least one threat in the data being sent to the network and the data being sent from the network;
a data log on the memory of the cyber security device, wherein the data log contains information concerning the at least one threat and the data log is accessible by a user accessing the memory of the cyber security device, wherein the high energy event log includes vehicle location derived from the global positioning satellite coordinates and inertial measurement unit data concerning the movement of the vehicle and the at least one threat is one or more from the group including a local active agent, a remote active agent, a time shift agent and an energy event where energy of a vehicle component exceeds one of a set voltage or set current and the cyber security device creates an event log of the energy event that is recorded on the memory of the cyber security device.

15. A method of operating a vehicle network security arrangement comprising the steps of:

providing a vehicle having a network that communicates with one or more external devices through a diagnostics port using one of a wired connection and a wireless connection;

providing a cyber security device with a connection to the network that permits the cyber security device to receive data being sent to the network and receive data being transmitted from the network, wherein the cyber security device includes an anomaly detection system for detecting at least one threat being communicated to the network;

providing a memory on the cyber security device;

providing one or more measurement sensors on the cyber security device that generate measurement data that augments the data monitored on the network;

transmitting from the one or more external devices one or more communications containing the at least one threat;

operating the cyber security device using the anomaly detection system to monitor the one or more communications and detect the at least one threat;

creating a data log on the memory of the cyber security device, wherein the data log contains information concerning the at least one threat and the data log is accessible by a user accessing the memory of the cyber security device;

operating the cyber security device to compare the measurement data to the data monitored on the network, and logging condition based maintenance messages on the memory of the cyber security device relating to the maintenance needs of the vehicle.

16. The method of claim 15 further comprising the step of generating an alert from the cyber security device to the network of the vehicle, indicating that at least one threat has been detected.

17. The method of claim 15 wherein the at least one threat is one or more from the group including a local active agent, a remote active agent, a time shift agent and an energy event where energy of a vehicle component exceeds one of a set voltage or set current and the cyber security device creates an event log of the energy event that is recorded on the memory of the cyber security device.

18. The method of claim 17 wherein the event log includes vehicle location derived from the global positioning satellite coordinates and inertial measurement unit data concerning the movement of the vehicle.

19. The method of claim 15 wherein they at least one threat is a local active agent where the one or more external devices sends to the one or more external devices through the diagnostics port, one of a diagnostic event communication or a re-flashing communication to the network and the cybersecurity device creates a high energy event log of the event that is recorded on a memory.

20. The method of claim 15 wherein the at least one threat is a remote active agent wherein the one or more external devices sends to the network through the diagnostics port an anomalous message that is not on a permitted list residing on the anomaly detection system of the cyber security device.

21. A method of operating a vehicle network security arrangement comprising the steps of:

providing a vehicle having a network that communicates with one or more external devices through a diagnostics port using one of a wired connection or a wireless connection;

providing a cyber security device with a connection to the network that permits the cyber security device to receive data being sent to the network and receive data being transmitted from the network, wherein the cyber security device includes an anomaly detection system for detecting at least one threat being communicated to the network;

providing a memory on the cyber security device;

transmitting from the one or more external devices one or more communications containing the at least one threat;

operating the cyber security device using the anomaly detection system to monitor the one or more communications and detect the at least one threat;

creating a data log on the memory of the cyber security device, wherein the data log contains information concerning the at least one threat and the data log is accessible by a user accessing the memory of the cyber security device, wherein the at least one threat is a time shift agent wherein the one or more external devices is attempting to re-install or update the firmware on the network causing the cyber security device to create a time shift log of the unexpected behavior.

22. The method of claim 21 wherein the time shift log includes vehicle location derived from the global positioning satellite coordinates and inertial measurement unit data concerning the movement of the vehicle.

23. The method of claim 15 wherein the one or more measurement sensors on the cyber security device include a global positioning satellite unit, a temperature sensor, a voltage sensor, a current sensor and an accelerometer sensor.

24. The method of claim 15 wherein the cyber security device is contained in the vehicle and is positioned between a communications port and an internal network where the one or more communications from the one or more external devices are received.

* * * * *